United States Patent [19]
Grimsrud

[11] Patent Number: 5,835,783
[45] Date of Patent: Nov. 10, 1998

[54] METHOD AND APPARATUS FOR UPLOADING PERIPHERAL CONTROL FUNCTIONS TO HOST

[75] Inventor: Knut Grimsrud, Aloha, Oreg.

[73] Assignee: Intel Corporation, Santa Clara, Calif.

[21] Appl. No.: 710,205

[22] Filed: Sep. 12, 1996

[51] Int. Cl.$^6$ ...................................................... G06F 13/00
[52] U.S. Cl. .......................................... 395/828; 395/825
[58] Field of Search .................................... 395/825, 826, 395/827, 828, 872, 874

[56] References Cited

U.S. PATENT DOCUMENTS 4,888,691  12/1989  George et al. ..................... 395/182.13
5,555,437   9/1996  Packer ..................................... 395/825
5,640,592   6/1997  Rao ......................................... 395/825

*Primary Examiner*—Glenn A. Auve
*Attorney, Agent, or Firm*—Blakely, Sokoloff, Taylor & Zafman

[57] ABSTRACT

A computer system having a memory allocation function is further programmed with a service provider for performing on behalf of a peripheral device, functions for controlling the peripheral device, uploaded by the peripheral device. A number of data structures are employed to facilitate uploading of the functions, and returning of the function results to the peripheral device. The peripheral device is constituted with logic for uploading the functions, at the peripheral device initiative, and retrieving the function results, when they become available, through the data structures.

28 Claims, 6 Drawing Sheets

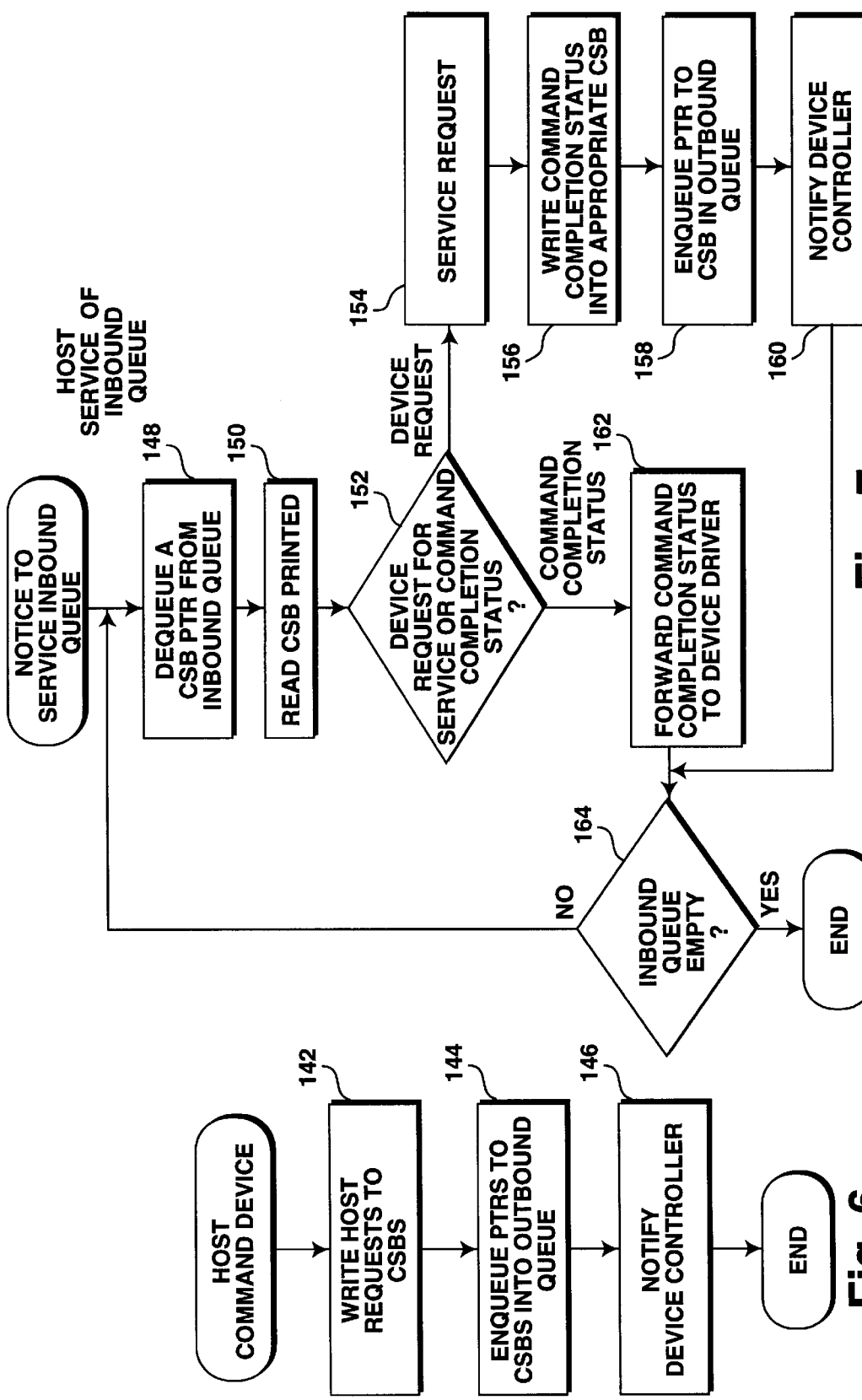

METHOD AND APPARATUS FOR UPLOADING PERIPHERAL CONTROL FUNCTIONS TO HOST

BACKGROUND OF THE INVENTION

1. Field of the Invention

The present invention relates to the field of computer systems. More specifically, the present invention relates to lowering the cost of peripheral devices.

2. Background Information

Historically, when computer systems were first developed, host processors performed most if not all of the functions for controlling the operations of the peripheral devices. The peripheral devices were slaves to the host processors. For example, a host processor would maintain a good sector list, an allocated sector list etc. for a disk drive, and direct the actual reading from, as well as writing to specific sectors or tracks of the storage medium of the disk drive. As well appreciated by those skilled in the art, this historic slave approach to controlling peripheral devices has numerous disadvantages, including burdening the host processor with data transfer and other miscellaneous tasks, as well as hampering device innovation, because the host processor must be appraised of the implementation details of the peripheral device, such as the device geometry, sectors, tracks, cylinders and so forth, in the case of a disk drive.

As time went on, most of the functions for controlling the operations of the peripherals devices have been distributed to the peripheral devices themselves, to free the host processors from the above described burdens and having to have intimate knowledge of the supported peripheral devices. Thus, many of today's peripheral devices for microprocessor based computer systems, such as disk drives, include integrated electronics that contain both dedicated controllers (typically implemented using application specific integrated circuits (ASIC) and embedded microcontrollers) and dedicated memory (such as random access memory or RAM). These ASICs, embedded microcontrollers and dedicated RAM add up to a significant part of the overall cost of the peripheral devices.

In recent years, microprocessor performance has increased dramatically, from a meager 16 MHz to well over 200 MHz, and memory prices have also fallen dramatically. Both trends are expected to continue without abatement. As a result, most of today's microprocessor based computer systems have abundant capacities to take on additional workloads. Thus, it will be desirable to reverse the trend of decentralization, and move some of the functions for controlling peripheral devices back to the host processors, thereby lowering the cost of the peripheral devices, provided that the uploading can be done without the disadvantages of the historic centralized slave approach, such as unduly burdening the host and hampering device innovation.

In copending application, Ser. No. 08/627,939, entitled Implementing Mass Storage Device Functions Using Host Processor Memory, assigned to the same assignee of the present invention, a method for implementing mass storage device functions using host system memory was disclosed. The disclosed invention provides for a method for a disk drive to use a portion of the system memory as its private memory, without the host processor having to know what the disk drive is using the private memory for, thereby eliminating the need to have to provide dedicated RAM to a disk drive, and in turn reducing the cost of disk drives.

As will be disclosed in more details below, the present invention allows a number of functions for controlling operation of a peripheral device to be uploaded, and performed by a host processor, without the undesirable disadvantages of the historic approach, thereby reducing the amount of logic and processing power having to be provided to the integrated controllers of the peripheral devices, which in turn reduces the cost of peripheral devices.

SUMMARY OF THE INVENTION

A computer system having a memory allocation function is further programmed with a service provider for performing on behalf of a peripheral device, functions for controlling the peripheral device, uploaded by the peripheral device. A number of data structures are employed to facilitate uploading of the functions, and returning of function completion status to the peripheral device. The peripheral device is constituted with logic for uploading the functions, at the peripheral device's initiative, and retrieving the function completion status, when they become available, through the data structures.

At its own initiative, the peripheral device places any function it desires to upload into the data structures in a self-descriptive manner. The service provider, which is executed by a host processor of the computer system, performs the placed functions on behalf of the peripheral device, and then places the function completion status in the data structures. In turn, the peripheral device retrieves the function completion status. In one embodiment, the service provider is notified of the presence of uploaded function, while the peripheral device is notified of the availability of the function completion status.

Additionally, the data structures are used to store commands destined for the peripheral device issued by a conventional device driver of the computer system, as well as command completion status from the peripheral device to the conventional device driver. In like manner, the service provider places the device driver commands onto the data structures. The peripheral device responds accordingly, which may include initiating uploading of one or more functions to be performed by the service provider. The peripheral device places the command completion status into the data structures. In turn, the service provider channels the command completion status to the device driver. As a result, the uploading of the functions for controlling the peripheral device is handled by the service provider transparently to the device driver.

In one embodiment, the data structures include a "collection" of command/status blocks, an inbound queue and an outbound queue. Each command/status block is used to store either an uploaded function and its corresponding function completion status, or a device driver command and its corresponding command completion status. The command/status blocks are "typed" accordingly, depending on their contents. The inbound and outbound queues are used to store pointers to these command/status blocks.

In one embodiment, the conventional device driver and the service provider are separate entities, communicating with each other through one or more interfaces. In an alternate embodiment, the service provider is an integral part of the conventional device driver.

BRIEF DESCRIPTION OF DRAWINGS

The present invention will be described by way of exemplary embodiments, but not limitations, illustrated in the accompanying drawings in which like references denote similar elements, and in which:

FIGS. 6–7 illustrates one embodiment each of the various operational steps performed by the service provider of FIG. 1;

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
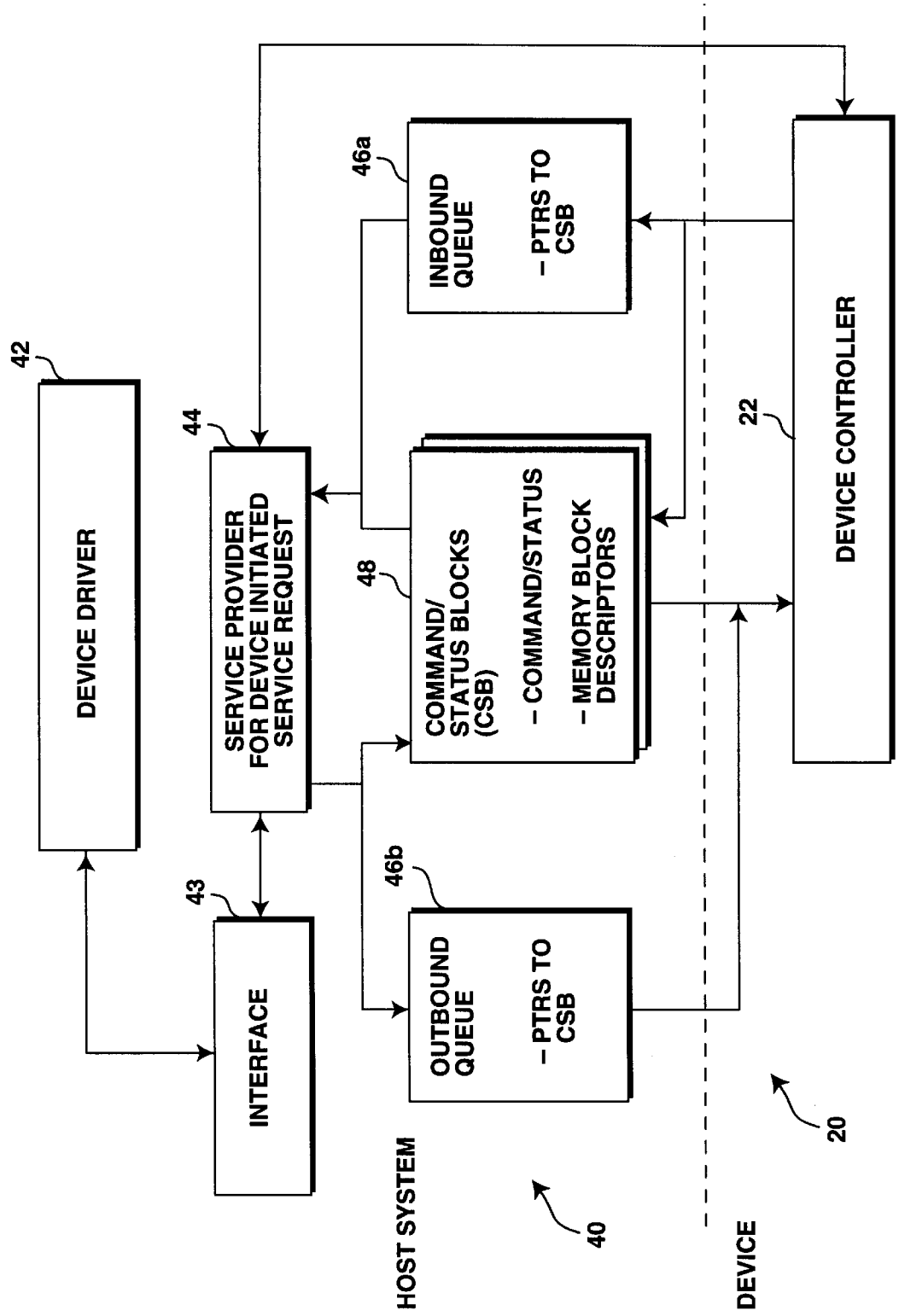
FIG. 1 illustrates one embodiment of the present invention.

Referring now to FIG. 1, wherein one embodiment of the present invention is shown. As illustrated, computer or host system 40 having a memory allocation function (not shown) is further programmed with service provider 44 for performing on behalf of peripheral device 20, functions for controlling peripheral device 20, uploaded by peripheral device 20. Data structures 46a–46b and 48 are employed to facilitate uploading of the functions, and returning of function completion status to peripheral device 20. Peripheral device 20 includes device controller 22 programmed with logic for uploading the functions, at peripheral device 20's initiative, and retrieving the function completion status, when they become available, through data structures 46a–46b and 48.

For the illustrated embodiment, data structures 46a–46b and 48 include a "collection" of command/status blocks (CSBs) 48, inbound queue 46a and outbound queue 46b. CSBs 48 are used to store uploaded functions and their function completion status. As will be described in more details below, CSBs 48 are also used to store commands destined for peripheral device 20 issued by device driver 42, and command completion status returned by peripheral device 20 for device driver 42.

For the illustrated embodiment, the uploaded functions and the corresponding function completion status are stored in the same CSBs 48. Similarly, the device driver commands and the corresponding command completion status are stored in the same CSBs 48. CSBs 48 are typed accordingly, to facilitate differentiation of the two types of contents. Inbound and outbound queues 46a and 46b are used to store pointers to CSBs 48.

For the illustrated embodiment, device driver 42 and service provider 44 are separate entities, communicating with each other through one or more interfaces 43, e.g. remapped I/O ports. In other words, service provider 44 channels the device driver commands and the command completion status through data structures 46a–46b and 48 for device driver 42, making the existence of data structures 46a–46b and 48 (and therefore the practice of the present invention) transparent to device driver 42. In an alternate embodiment, service provider 44 is integrated with device driver 42. In other words, integrated device driver 42 is cognizant of the existence of data structures 46a–46b and 48 (and therefore the practice of the present invention).

Figure 2:
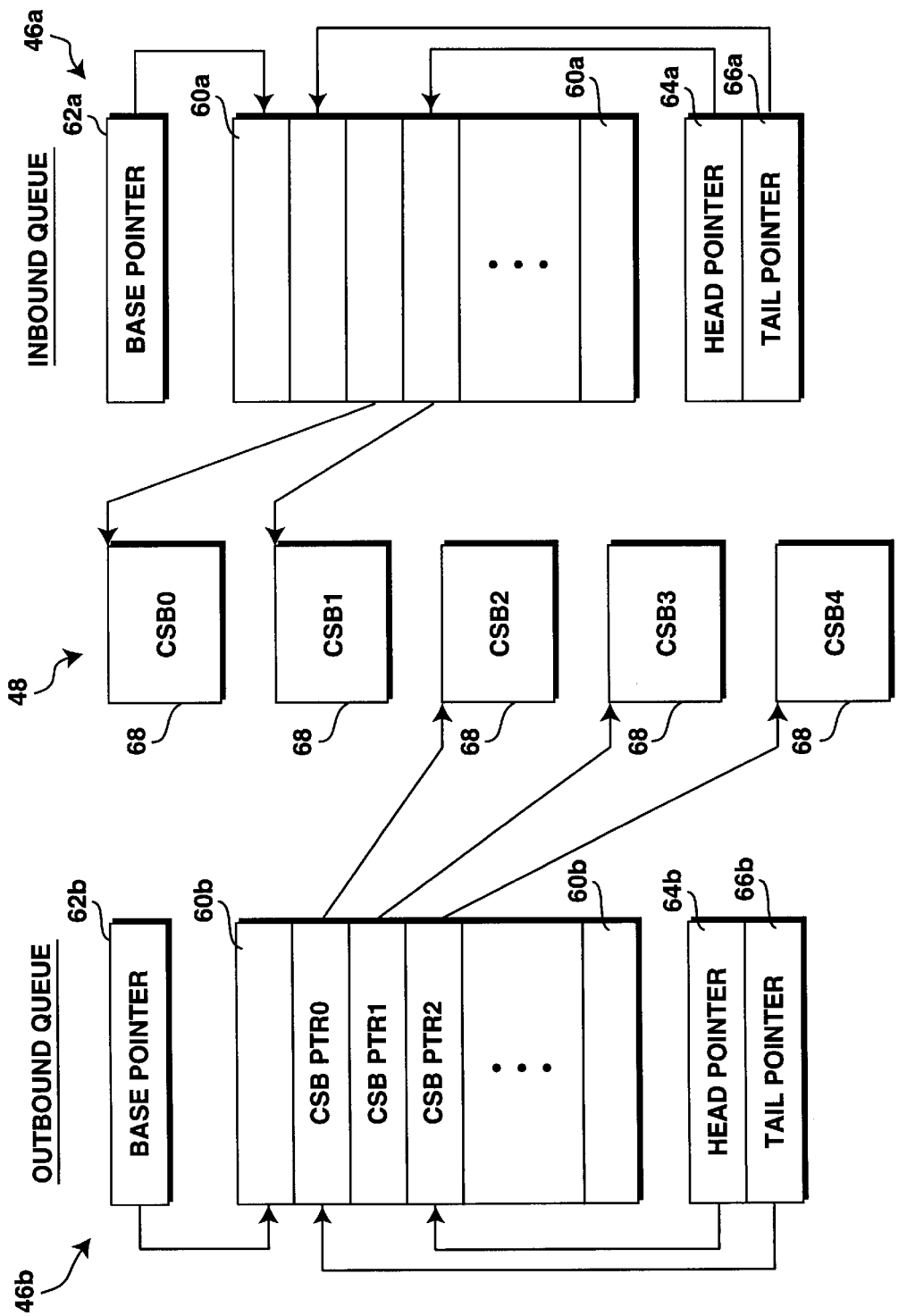
FIGS. 2–3 illustrate one embodiment each of the data structures of FIG. 1 in further detail.
Figure 3:
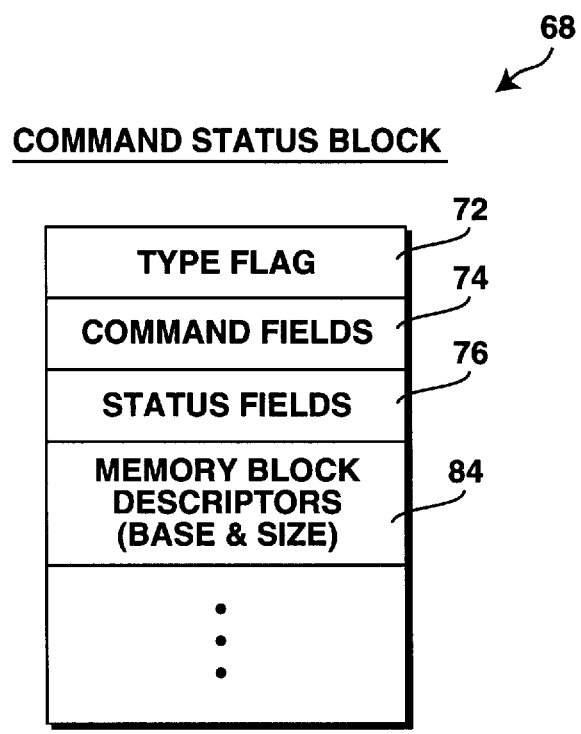

FIGS. 2–3 illustrate one embodiment each of data structures 46a–46b and 48 in further detail. As shown, for the illustrated embodiment, each CSB 48 includes type flag 72, command fields 74, status fields 76, and block descriptors 84. Type flag 72 denotes whether a particular CSB 48 is inbound oriented or outbound oriented, thereby allowing the content type of CSBs 48 to be discernible by service provider 42 and device controller 22. An inbound oriented CSB 48 contains an uploaded function to be performed by service provider 44, and the resulting function completion status, whereas an outbound oriented CSB 48 contains a device driver command and the resulting command completion status.

When a CSB 48 is used for uploading a function, command fields 74 contain description of the uploaded function, and status fields 76 contain the resulting function completion status. More specifically, for the illustrated embodiment, the description includes opcodes and operands from a predefined function protocol. On the other hand, when a CSB 48 is used for commanding peripheral device 20, command fields 74 contain a device driver command, and status fields 76 contain the resulting command completion status. Each block descriptor 84 contains a base address and a size value for a block of memory, wherein data associated with the uploaded function are stored, e.g. data to be operated on when the uploaded function is performed by service provider 44.

Each of inbound and outbound queues 46a or 46b includes a number of pointers 60a or 60b pointing to CSBs 48. Additionally, each of inbound and outbound queues 46a or 46b includes a base pointer 62a or 62b pointing to the starting location of the queue 46a or 46b, a head pointer 64a or 64b pointing to the current head position of the queue 46a or 46b, and a tail pointer 66a or 66b pointing to the current tail position of the queue 46a or 46b.

Figure 5:
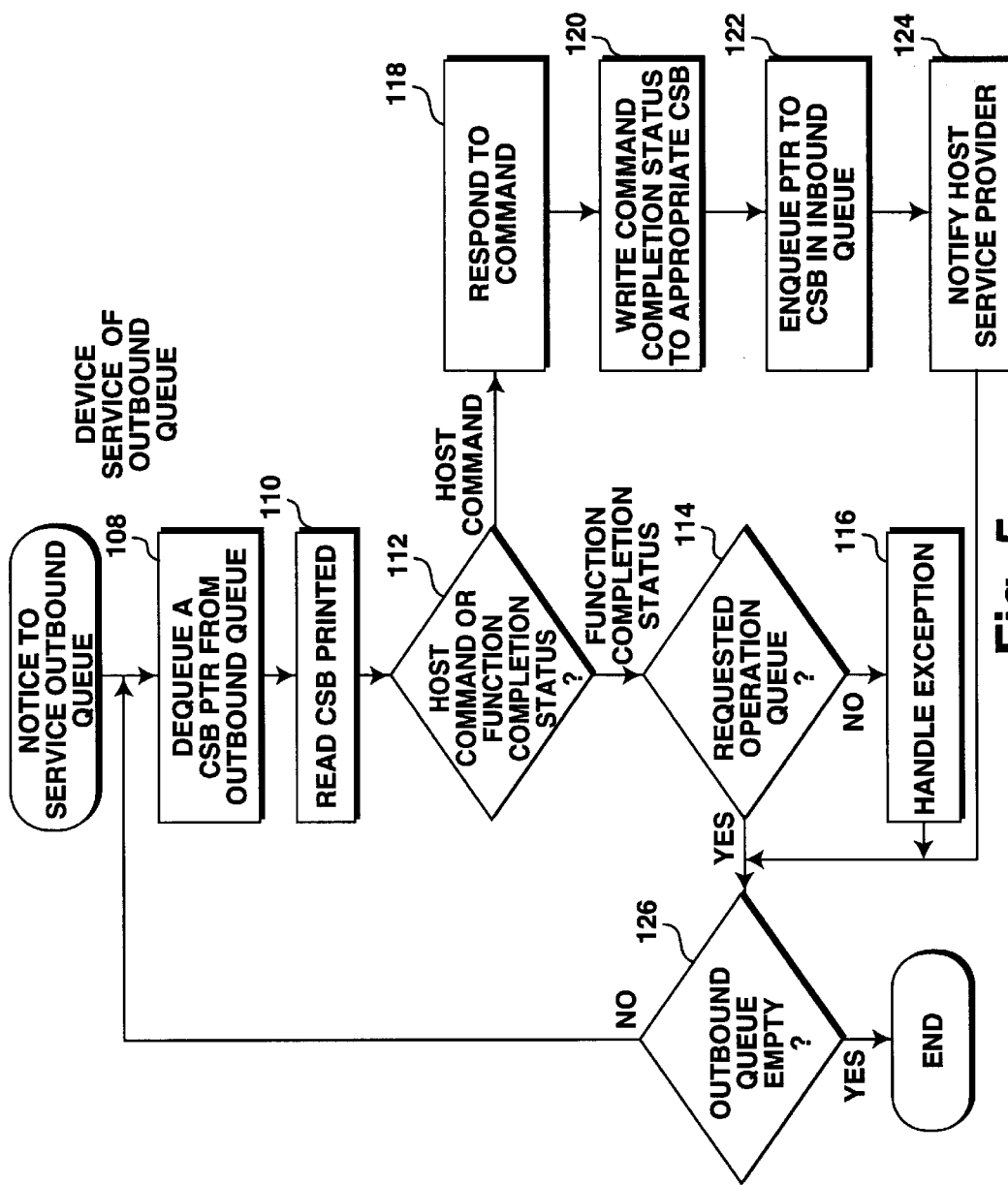
FIGS. 4–5 illustrate one embodiment each of various operational steps performed by the device controller of FIG. 1.
Figure 4:
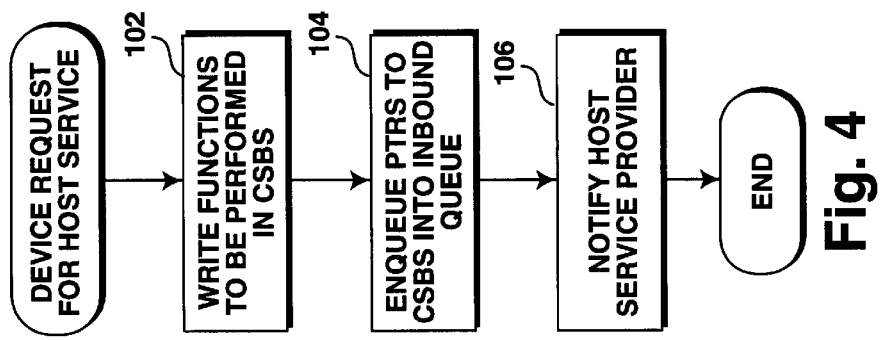

FIGS. 4–5 illustrate one embodiment each of various operational steps of device controller 22 of peripheral device 20, and FIGS. 6–7 illustrate one embodiment each of various operational steps of service provider 44. For the illustrated embodiment, as shown in FIG. 4, at its own initiative, device controller 22 places one or more functions it desires to upload into CSBs 48 (one function per CSB) with type flags 72 set to "inbound", step 102, and enqueues corresponding pointers 60a pointing to the CSBs 48 (one pointer per CSB) in inbound queue 46a, step 104. Device controller 22 then notifies service provider 44 of its action, step 106.

Upon being notified, as illustrated in FIG. 7, service provider 44 dequeues a pointer 60a from inbound queue 46A, step 148, and locates the CSB 48 pointed at by the dequeued pointer 60a, step 150. Service provider 44 then determines whether the CSB 48 contains uploaded functions or command completion status, step 152. If the CSB 48 contains uploaded functions (type flag 72 denoting "inbound"), service provider 44 performs the uploaded function on behalf of peripheral device 20, step 154. Upon performing the uploaded function, service provider 44 places the function completion status in the same CSB 48, step 56, and enqueues a pointer 60b pointing to the CSB 48 in outbound queue 46b, step 158. Then, service provider 44 notifies device controller 22 of the fact that an uploaded function has been completed, step 160. On the other hand, if back at step 152, the CSB 48 was determined to contain a command completion status (type flag 72 denoting "outbound"), service provider 44 forwards the command completion status to device driver 42, step 156.

Either case, that is upon servicing an uploaded function or forwarding a command completion status, service provider 44 determines if inbound queue 46a is empty, step 164. If inbound queue 46a is not empty, service provider 44 repeats the above described process steps 148–162, one enqueued pointer at a time, until inbound queue 46a becomes empty.

Referring now to FIG. 6, in addition to enqueuing pointers 60b into outbound queue 46b after writing function completion status into appropriate CSBs 48, service provider 44 also enqueue pointers 60b into outbound queue 46b after setting up a CSB 48 for the purpose of channeling commands issued by device driver 42 to device controller 22. As shown, service provider 44 channels device driver commands by first placing the command into a CSB 48 with type flag 72 set to "outbound", step 142, and enqueuing a pointer 60b pointing to the CSB 48 in outbound queue 46b, step 144. Having done so, service provider 44 then notifies device controller 22 of its action.

Referring now to FIG. 5, thus upon being notified, device controller 22 dequeues a pointer 60b from outbound queue 46b, step 148, locates the CSB 48 pointed at by the dequeued pointer 60b, step 150, and determines whether the located CSB 48 contains a device driver command or a function completion status, step 152. If the CSB 48 was determined to contain a device driver command (type flag 72 denoting "outbound"), device controller 22 responds to the device driver command accordingly (which may include uploading of one or more functions to be performed by service provider 44), step 118. In due course, device controller 22 places the command completion status in the appropriate CSB 48, step 120, and enqueues a pointer 60a pointing to the CSB 48 in inbound queue 46a, step 122. Upon doing so, device controller 22 notifies service provider 44 of its action. On the other hand, if back at step 112, the CSB 48 was determined to contain a function completion status (type flag 72 denoting "inbound"), device controller 22 further determines if the uploaded function was performed successfully, step 114. If the uploaded function was performed successfully, device controller 22 determines if outbound queue 46b is empty, step 126, otherwise, device controller 22 handles the exception, step 116, before performing step 126. If outbound queue 46b is determined to be non-empty, device controller 22 repeats the above described steps 108–124 until outbound queue 46b becomes empty.

As a result, the uploading of the functions for controlling peripheral device 20 to host system 40 is handled transparently to device driver 42. Host system 40 is not burdened with the details of data transfer, and no knowledge of the implementation detail of peripheral device 20 is required of host system 40. Furthermore, the present invention is highly scalable, allowing for a wide performance spectrum of peripheral devices, and yet they all can incorporate the teachings of the present invention. For example, high end peripheral devices would only occasionally upload the most complex functions to the host, whereas the low end peripheral devices would upload virtually all functions to the host, except for the most simple ones. In another example high end peripheral devices could upload fully descriptive functions that virtually do not require the host to have any knowledge of the implementation details of the peripheral devices, while the low end peripheral devices could upload almost fully descriptive functions that do require the host to have a little knowledge of the implementation details of the peripheral devices.

While for ease of explanation, the present invention has been described with an embodiment where service provider 44 is responsible for writing the function completion status into the appropriate command/status block, upon performing the uploaded function, in an alternate embodiment, device controller 22 pre-writes the successful function completion status into the command/status block, thereby partially relieving service provider 44 of the responsibility. In other words, service provider 44 has to write the function completion status into the appropriate command/status block, only if the uploaded function failed. In the event of successful performance of the uploaded function, service provider 44 merely has to enqueue a pointer 60b in outbound queue 46b. Similarly, pre-writing of a successful command completion status could also be done by service provider 44. For such an embodiment, in like manner, device controller 22 would just have to enqueue a pointer 60a in inbound queue 46a in the event of successful performance of the device driver command.

Figure 8:
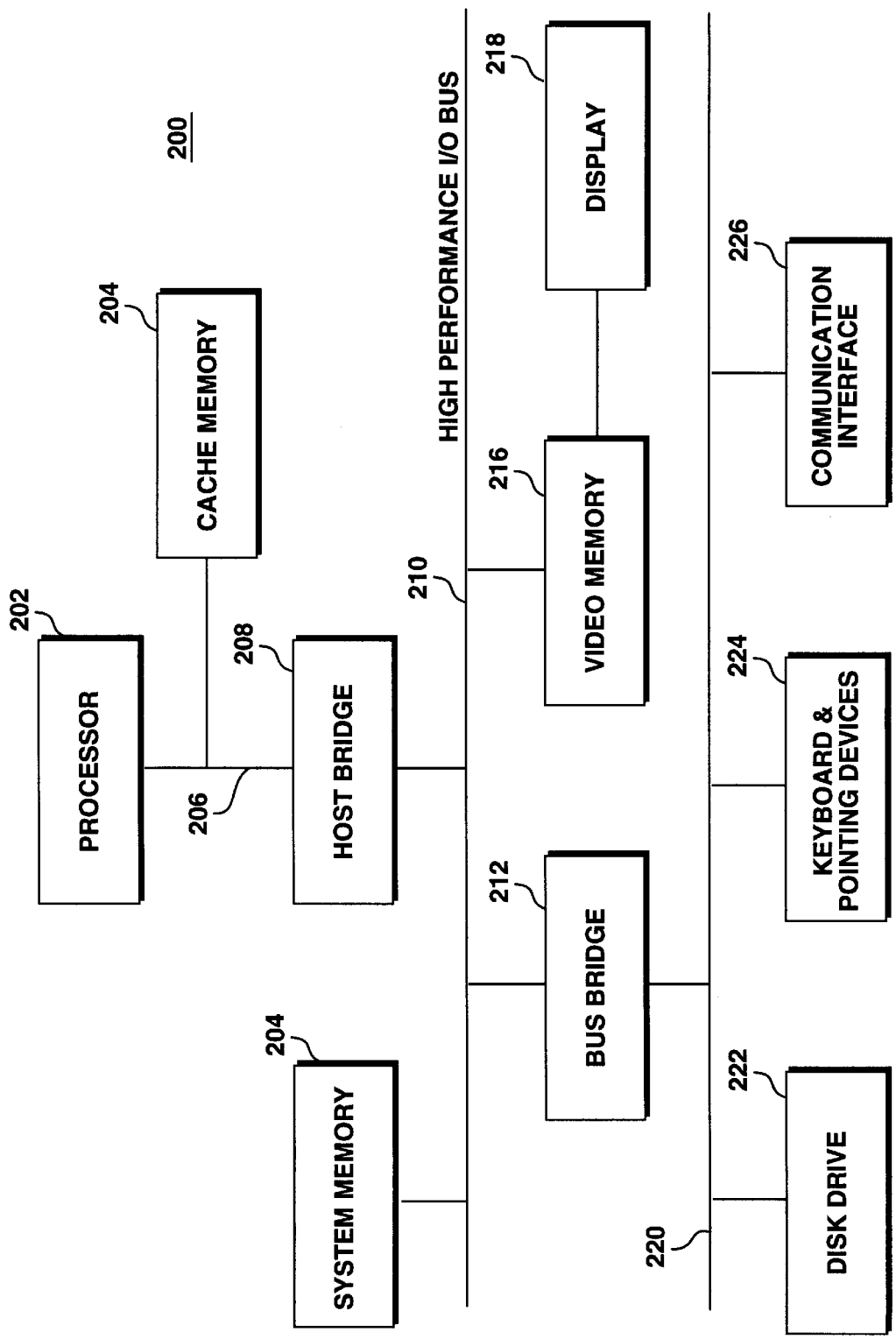
FIG. 8 illustrates one embodiment of a computer system suitable for programming with the embodiment of the present invention illustrated in FIG. 1.

FIG. 8 illustrates one embodiment of a computer system suitable for practicing the present invention described above. As shown, for the illustrated embodiment, computer system 200 includes processor 202, processor bus 206, high performance I/O bus 210 and standard I/O bus 220. Processor bus 206 and high performance I/O bus 210 are bridged by host bridge 208, whereas I/O buses 210 and 212 are bridged by I/O bus bridge 212. Coupled to processor bus is cache 204. Coupled to high performance I/O bus 210 are system memory 214 and video memory 216, against which video display 218 is coupled. Coupled to standard I/O bus 220 are disk drive 222, keyboard and pointing device 224 and communication interface 226.

These elements perform their conventional functions known in the art, except disk drive 222 is incorporated with the teachings of the present invention. In other words, disk drive 222 includes a controller programmed with logic to upload functions for controlling disk drive 222 as described above. The conventional functions known in the art include in particular the ability for disk drive 222 to access system memory 214. Furthermore, disk drive 222 and system memory 214 are used to store a permanent and a working copy of the programming instructions for effectuating the teachings of the present invention, e.g. service provider 44, when executed by processor 202. System memory 214 is used to store data structures 46a–46b and 48, as well as the data associated with the uploaded functions. Except for the teachings of the present invention, constitutions of these elements are known. Any one of a number of implementations of these elements known in the art may be used to form computer system 200 for practice of the present invention.

While the method and apparatus of the present invention have been described in terms of the above illustrated embodiments, those skilled in the art will recognize that the invention is not limited to the embodiments described. The present invention can be practiced with modification and alteration within the spirit and scope of the appended claims. In particular, numerous variants of the above described data structures may be employed instead. Accordingly, the description is to be regarded as illustrative instead of restrictive on the present invention.

Thus, methods and apparatuses for uploading functions for controlling a peripheral device to host have been described.

What is claimed is:

1. A peripheral device comprising a controller having operating logic that uploads on the peripheral device's own initiative a plurality of functions to a host system hosting the peripheral device to have the uploaded functions performed on the host system for the peripheral device, the uploaded functions being functions for controlling the peripheral device, and the uploading being accomplished using command blocks, which are identified to the host system.

2. The peripheral device as set forth in claim 1, wherein the operating logic includes logic for placing commands of the functions being uploaded into the command blocks.

3. The peripheral device as set forth in claim 1, wherein the command blocks are also used as status blocks for returning function completion status to the peripheral device, and the operating logic includes logic that pre-writes successful function completion status into the command/status blocks.

4. The peripheral device as set forth in claim 1, wherein the command blocks are also used as status blocks for returning function completion status to the peripheral device, and the operating logic includes logic that reads function completion status stored in the command/status blocks, and responds accordingly.

5. The peripheral device as set forth in claim 1, wherein the command blocks are identified to the host by pointers pointing to the command blocks, and the operating logic includes logic that enqueues the pointers in an inbound queue.

6. The peripheral device as set forth in claim 1, wherein the command blocks are also used as status blocks for returning function completion status to the peripheral device, the command/status blocks being identified to the peripheral device using pointers pointing to the command/status blocks with function completion status, and the operating logic includes logic that dequeues the stored pointers from an outbound queue.

7. The peripheral device as set forth in claim 1, wherein the command blocks are also used as status blocks for returning function completion status to the peripheral device, as well as for providing commands to the peripheral device, the command/status blocks being typed, and the operating logic includes logic that types command/status blocks being used for uploading functions as an inbound type, and logic that determines a command/status block's type.

8. The peripheral device as set forth in claim 1, wherein the command blocks are also used as status blocks for returning function completion status to the peripheral device, as well as for providing commands to the peripheral device and returning command completion status to the host, and the operating logic includes logic that stores command completion status into the command/status blocks.

9. In a peripheral device, a method for uploading functions for controlling the peripheral device to a host for performance of the uploaded functions by the host, the method comprising:

a) storing full description of a function to be uploaded in a command block;
b) identifying the command block to the host;
c) receiving identification of a status block from the host; and
d) retrieving function completion status of a previously uploaded function from the identified status block.

10. The method as set forth in claim 9, wherein step (a) includes storing commands of the function being uploaded in the command block.

11. The method as set forth in claim 9, wherein the command block of steps (a) and (b) and the status block of steps (c) and (d) are the same command/status block, and step (a) further includes pre-writing a successful function completion status into the command/status block.

12. The method as set forth in claim 9, wherein step (d) includes reading and responding to function completion status stored in the status block.

13. The method as set forth in claim 9, wherein step (b) includes enqueuing a pointer pointing to the command block in an inbound queue.

14. The method as set forth in claim 9, wherein step (d) includes dequeuing a pointer pointing to the status block in an outbound queue.

15. The method as set forth in claim 9, wherein
the command block of steps (a) and (b) and the status block of steps (c) and (d) are the same command/status block,
the command/status blocks are typed and also used to provide commands to the peripheral device, with the command/status blocks of a first type being used for uploading functions to the host, and returning function completion status to the peripheral device, and a second type being used for providing commands to the peripheral device,
step (a) further includes typing command/status block to the first type, and
step (d) further includes determining a command/status block's type.

16. The method as set forth in claim 9, wherein
the command block of steps (a) and (b) and the status block of steps (c) and (d) are the same command/status block,
the command/status blocks are typed and also used to provide commands to the peripheral device, with the command/status blocks of a first type being used for uploading functions to the host, and returning function completion status to the peripheral device, and a second type being used for providing commands to the peripheral device, and returning command completion status to the host, and
the method further includes step (d) responding to a command stored in a command/status block of the second type, and step (e) storing command completion status in the command/status block of the second type.

17. A computer system comprising:
(a) a storage medium having stored therein a plurality of programming instructions;
(b) an execution unit coupled to the storage medium to execute the programming instructions to perform functions uploaded from a peripheral device for the peripheral device, the functions being self-descriptive and being performed for controlling the peripheral device, and the uploading being accomplished through command blocks, which are identified to the programming instructions.

18. The computer system as set forth in claim 17, wherein the command blocks are identified to the programming instructions using pointers stored in an inbound queue; and the execution further executes the programming instructions to dequeue pointers stored in the inbound queue.

19. The computer system as set forth in claim 17, wherein the command blocks are also used to return corresponding function completion status to the peripheral device; and the execution unit further executes the programming instructions to store function completion status into the corresponding ones of the command/status blocks.

20. The computer system as set forth in claim 17, wherein the command blocks are also used to return corresponding function completion status to the peripheral device;

the execution unit further executes the programming instructions to enqueue pointers pointing to the command/status blocks with function completion status in an outbound queue.

21. The computer system as set forth in claim 17, wherein the command blocks are also used to return function completion status to the peripheral device, as well as provide commands of a device driver to the peripheral device, the command/status blocks being typed, with a first type that uploads functions for the programming instructions and returning function completion status to the peripheral device, and a second type for providing commands of the device driver to the peripheral device, and the programming instructions further types a command/status block.

22. The computer system as set forth in claim 17, wherein the command blocks are also used to return function completion status to the peripheral device, as well as provide commands of a device driver to the peripheral device and return command completion status to the device driver, the command/status blocks being typed, with a first type for uploading functions to the programming instructions and returning function completion status to the peripheral device, and a second type for providing commands of the device driver to the peripheral device and returning command completion status to the device driver, and the programming instructions include logic for determining a command/status block's type and logic for typing a command/status block.

23. In a computer system, a method for facilitating performance of functions uploaded from a peripheral device for controlling the peripheral device, the method comprising:

a) locating command blocks set up and identified by the peripheral device at the peripheral device's own initiative;

b) executing commands pre-stored by the peripheral device in the command blocks; and c) identifying status blocks with function completion status to the peripheral device.

24. The method as set forth in claim 23, wherein step (a) includes dequeuing pointers from an inbound queue, the pointers being placed into the inbound queue by the peripheral device and correspondingly pointing to the command blocks.

25. The method as set forth in claim 23, wherein the command blocks of step (a) and the status block of step (c) are the same command/status block, the command/status blocks being also used for providing commands of a device driver to the peripheral device, and returning command completion status to the device driver, the command/status blocks being typed, with a first type being used for uploading functions from the peripheral device and returning function status to the peripheral device, and a second type being used for providing commands of the device driver to the peripheral device and returning command completion status to the device driver, and step (b) includes determining a command/status block's type.

26. The method as set forth in claim 23, wherein the command blocks of step (a) and the status block of step (c) are the same command/status block, and step (c) includes storing function completion status into the command/status blocks.

27. The method as set forth in claim 23, wherein step (c) includes enqueuing pointers into an outbound queue, the pointers correspondingly pointing to the status blocks.

28. The method as set forth in claim 23, wherein the command blocks of step (a) and the status block of step (c) are the same command/status block, the command/status blocks being also used for providing commands of a device driver to the peripheral device, and returning command completion status to the device driver, the command/status blocks being typed, with a first type being used for uploading functions from the peripheral device and returning function status to the peripheral device, and a second type being used for providing commands of the device driver to the peripheral device and returning command completion status to the device driver, and the method further includes step (d) storing commands of a device driver into a command/status block, and step (e) identifying the command/status block with commands of a device driver to the peripheral device.

* * * * *